(12) United States Patent
Johnson, III (10) Patent No.: US 10,361,788 B1
(45) Date of Patent: Jul. 23, 2019

(54) TUNABLE NARROWBAND INFRARED RECEIVER

(71) Applicant: ROKU, INC., Los Gatos, CA (US)

(72) Inventor: Neil Edward Johnson, III, Cambridge (GB)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/999,022

(22) Filed: Aug. 20, 2018

(51) Int. Cl.
*H04B 10/00* (2013.01)
*H04B 10/43* (2013.01)
*G08C 23/04* (2006.01)
*H04B 10/114* (2013.01)
*H04J 14/00* (2006.01)

(52) U.S. Cl.
CPC ............ *H04B 10/43* (2013.01); *G08C 23/04* (2013.01); *H04B 10/1141* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118; H04N 5/4403; H04N 2005/4405; H04N 2005/4426; H04N 2005/4435; H04N 2005/4442
See application file for complete search history.

(56) References Cited

U.S. PATENT DOCUMENTS 4,313,227 A * 1/1982 Eder ................. A63F 13/06
340/12.15

* cited by examiner

*Primary Examiner* — Daniel G Dobson
(74) *Attorney, Agent, or Firm* — Sterne, Kessler, Goldstein & Fox P.L.L.C.

(57) ABSTRACT

Disclosed herein are a device, method, and computer-readable device for tuning a tunable narrowband infrared (IR) receiver to be compatible with a number of different remote controls having different frequencies. The tunable narrowband IR receiver may be configured to receive IR signals across a number of frequency bands and processing the IR signals in order to learn remote controls having different frequencies.

20 Claims, 4 Drawing Sheets

TUNABLE NARROWBAND INFRARED RECEIVER

FIELD

This disclosure is generally directed to a tunable narrow band infrared (IR) receiver that can be tuned to receive signals from a variety of remote controls having different frequencies.

BACKGROUND

Conventional IR receivers are capable of learning a new remote control by processing instructions within IR signals transmitted by these remote controls. However, these conventional IR receivers receive IR signals at a fixed-frequency which limits their flexibility because they are tuned to that single specific frequency. Such IR receivers therefore only are compatible with remote controls transmitting at that specific frequency. Accordingly, conventional IR receivers cannot be compatible with remote controls that transmit at frequencies different from the specific frequency to which the IR receivers are tuned. This constraint on conventional IR receivers is especially problematic for users having multiple remote controls for different devices and that transmit their commands at different frequencies.

SUMMARY

Provided herein are a system, apparatus, method and/or computer program product embodiments, and/or combinations and sub-combinations thereof, for tuning a tunable narrowband IR receiver to receive signals from remote controls having different frequencies. For illustrative purposes, embodiments are described with respect to an example of a tunable narrowband IR receiver in a media streaming environment. However, this disclosure is not limited to these example embodiments. Instead, the functions and structures described herein are applicable to a tunable narrowband IR receiver in any environment or application.

An embodiment is directed to a system, apparatus, method and/or computer program product embodiments, and/or combinations and sub-combinations thereof, for tuning a tunable narrowband IR receiver so that it is capable of receiving signals having different frequencies. In a non-limiting embodiment, the apparatus is a tunable narrowband IR receiver that may include an IR diode configured to receive an IR signal and a frequency mixer that is configured to receive the IR signal from the IR diode and receive a local oscillator signal wherein the local oscillator signal is associated with a frequency band. The frequency mixer may then be configured to combine the IR signal and the local oscillator signal to produce a shifted signal within the frequency band. The tunable narrowband IR receiver may also include a bandpass filter configured to filter the shifted signal by removing, from the shifted signal, signals that are outside of the frequency band to produce a filtered signal.

Another embodiment is directed to a method that includes steps for tuning a tunable narrow IR receiver. In an embodiment, the method includes receiving a command to initiate tuning of the narrowband IR receiver and initiating, based on the command, a scan across an entire frequency band. The method may further include detecting, based on the scan, an IR signal from a remote control, wherein the IR signal comprises a remote control code associated with the remote control. In order to produce a shifted signal within a frequency band, the method may include combining the IR signal and a local oscillator signal to produce a shifted signal within the frequency band. The method also may include filtering the shifted signal by removing, from the shifted signal, signals that are outside of the frequency band to produce a filtered signal and processing the filtered signal to detect the remote control code associated with the remote control.

Another embodiment is directed to a non-transitory, tangible computer-readable device having instructions stored thereon that, when executed by a tunable narrowband IR receiver, causes the tunable narrowband IR receiver to perform operations for initiating tuning. The operations may include steps of receiving a command to initiate tuning of the narrowband IR receiver and initiating, based on the command, a scan across an entire frequency band. The operations may further include processing of an IR signal including detecting, based on the scan, the IR signal from a remote control and combining the IR signal and a local oscillator signal to produce a shifted signal within the frequency band. The operations may also include filtering the shifted signal by removing, from the shifted signal, signals that are outside of the frequency band to produce a filtered signal and processing the filtered signal to detect the remote control code associated with the remote control.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Conventional IR receivers are narrowband receivers which limit the number of frequency bands with which the receivers are compatible. Previous attempts to overcome this fixed frequency constraint of conventional IR receivers include implementing a wideband IR receiver. Such an implementation allows a receiver to scan across a wider range of frequencies but at the cost of significantly decreasing the range of the IR receiver when compared to narrowband IR receivers. Sending signals to a wideband IR receiver required the remote control to be within a certain distance of the receiver which limited the effectiveness and functionality of this implementation. The present disclosure combines the range advantage of narrowband receivers with the variable frequency flexibility of wideband receivers.

Figure 1:
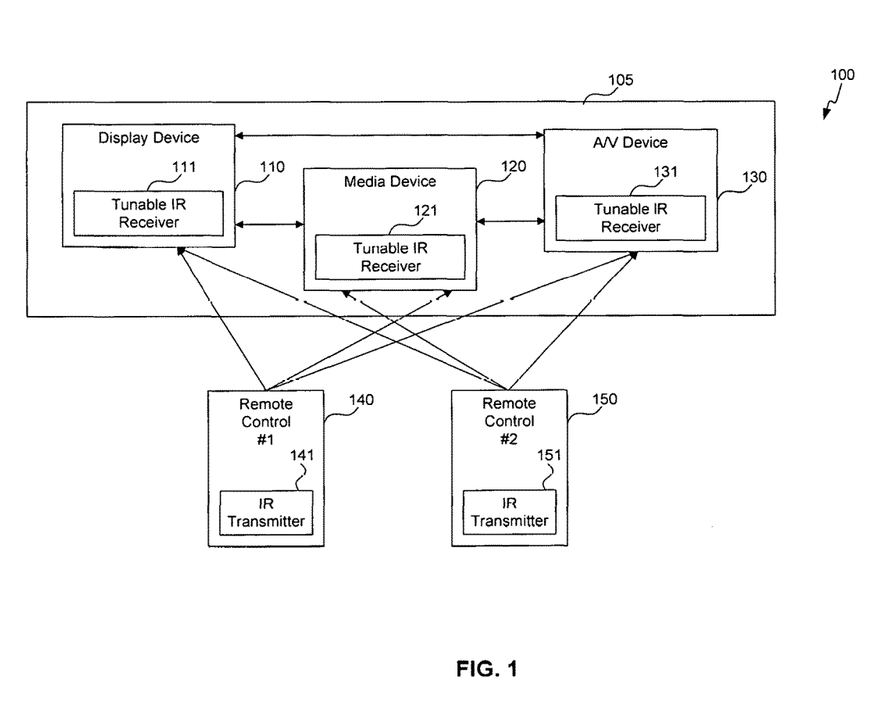
FIG. 1 illustrates a block diagram of a multimedia environment that includes one or more media systems, one or more content servers, and one or more control servers, according to some embodiments.

FIG. 1 illustrates a block diagram of a multimedia environment 100, according to some embodiments. In a non-limiting example, multimedia environment 100 is directed to playing content, such as video content (having associated audio) and/or audio content, on a media system 105.

Multimedia environment 100 may include one or more media systems 105. In an embodiment, media system 105 includes a display device 110, media device 120, audio/visual device 130, a first remote control 140, and a second remote control 150. Although only a single device representing each of display device 110, media device 120, and A/V device 130 is illustrated within media system 105, a person of ordinary skill in the art would understand that media system 105 may comprise any number of these devices. Similarly, a person of ordinary skill in the art would understand that the media system 105 is not limited to the specific number of remote controls and may comprise more or less than the number shown in FIG. 1.

Display device 110 may be implemented as, for example, a monitor, television, computer, smart phone, tablet, and/or projector, to name just some examples. Display device 110 may support 4K or 4K HDR, for example, or any other resolution. Display device 110 may include any number and type of ports for receiving video content. Depending on the type and/or age of display device 110, these ports may be implemented as different HDMI ports such as an HDMI 1.4 port, an HDMI 2.0 port, HDMI Audio Return Channel (ARC) port, an HDML Mobile High-Definition Link port, or an HDML Digital Video In (DVI) port, to name just a few examples.

Display device 110 also may include tunable narrowband IR receiver 111 which receives IR signals from first remote control 140 and second remote control 150. First remote control 140 includes IR transmitter 141 and second remote control 150 includes IR transmitter 151. In an embodiment, IR transmitter 141 may transmit an IR signal having a first frequency within a first frequency band and IR transmitter 151 may transmit an IR signal having a second frequency within a second frequency band. In an embodiment, the first frequency is different from the second frequency. In an embodiment, the first frequency band may be different from, the same as, or overlap the second frequency band. As noted above, a person of ordinary skill in the art would understand that media system 105 is not limited to two remote controls but may include any number of remote controls that transmit IR signals at varying frequencies.

Media device 120 may be implemented as, for example, a streaming media device, DVD device, audio/video playback device, cable box, a video game console, a Blu-ray disc player, and/or digital video recording device, to name just some examples. Media device 120 may include any number and type of ports for outputting video content. Depending on the type and/or age of media device 120, these ports may also be implemented as different HDMI ports as described above with regard to display device 110. In some embodiments, the media device 120 can be a part of, integrated with, operatively coupled to, and/or connected to display device 110.

Media device 120 also may include tunable narrowband IR receiver 121 which receives IR signals from first remote control 140 and/or second remote control 150. In an embodiment, tunable narrowband IR receiver 121 may operate in the same manner as tunable narrowband IR receiver 111 as described above. For example, tunable narrowband IR receiver 121 may receive an IR signal having a first frequency from IR transmitter 141 of first remote control 140, and another IR signal having a second frequency from IR transmitter 151 of second remote control 150.

A/V device 130 may be implemented within media system 105 for connecting to display device 110 and/or media device 120. In an embodiment, A/V device 130 in an embodiment, A/V device 130 may be a speaker or other device that provides and receives audio/visual information from devices within media system 105. More than one media device 120 may be included in media system 105, and A/V device 118 may serve as a hub for receiving audio and video signals from multiple sources within media system 105. For example, A/V device 118 may be connected to display device 110 and the media device 120 within media system 105.

Similar to A/V device 130 display device 110 and media device 120, A/V device 130 may also include tunable narrowband IR receiver 131 which receives IR signals from first remote control 140 and/or second remote control 150. In an embodiment, tunable narrowband IR receiver 131 may operate in the same manner as tunable narrowband IR receiver 111 and/or tunable narrowband IR receiver 121 as described above. For example, tunable narrowband IR receiver 121 may receive an IR signal having a first frequency from IR transmitter 141 of first remote control 140 and another IR signal having a second frequency from IR transmitter 151 of second remote control 150.

In an embodiment, interaction with display device 110, media device 114, and/or A/V device 130 may be via first remote control 140 and second remote control 150. First remote control 140 and second remote control 150 may be any component, part, apparatus or method for controlling media device 110 and/or display device 120, such as a remote control, a tablet, laptop computer, smartphone, on-screen controls, integrated control buttons, or any combination thereof.

As will be discussed in more detail with respect to FIG. 2, tunable narrowband IR receiver 111, tunable narrowband IR receiver 121, and/or tunable narrowband IR receiver 131 may include components for receiving and processing IR signals across an increased range of frequencies when compared to conventional narrowband fixed frequency IR receivers. In the following discussion, features of tunable narrowband IR receiver 111 will be discussed but such features also apply to tunable narrowband IR receiver 121 and tunable narrowband IR receiver 131.

Tunable narrowband IR receiver 111 may employ two different modes for receiving IR signals. In an embodiment, a first mode is a learning mode and a second mode is a command mode. In the learning mode, tunable narrowband IR receiver 111 may learn configuration information regarding a new remote control, such as first remote control 140 and/or second remote control 150. The learned configuration information enables tunable narrowband IR receiver 111 to be compatible with the new remote control by, for example, receiving and processing subsequent commands from the new remote control.

In an embodiment, the learning mode may be initiated by a command received from display device 110, media device 120, and/or A/V device 130. For example, display device 110 and/or media device 120 may display a selectable menu option associated with the learning mode on a graphical user interface. Selection of the selectable menu option may result in transmitting a command to initiate the learning mode on tunable narrowband IR receiver 111. In an embodiment, the command may be received directly from an interface (not shown) such as button or touch inputs located or otherwise displayed on an exterior of display device 110, media device 120, and/or A/V device 130.

Upon initiating learning mode, tunable narrowband IR receiver 111 and/or tunable narrowband IR receiver 112 may scan across multiple different frequency bands to detect any signals transmitted by a new remote control. In an embodiment, the frequency bands include but are not limited to 30 kHz, 33 kHz, 36 kHz, 40 kHz, and 56 kHz. Tunable narrowband IR receiver 111 and/or tunable narrowband IR receiver 112 may determine a signal is transmitted by a remote control based on specific codes within the signal. In an embodiment, the determination of whether a signal was transmitted by a remote control may include tunable narrowband IR receiver 111 and/or tunable narrowband IR receiver 112 extracting codes from received signals and comparing the extracted codes with stored codes (e.g., stored in a memory (not shown) of display device 110 and/or media device 120). Certain stored codes are associated with remote controls. In an embodiment, tunable narrowband IR receiver 111 and/or tunable narrowband IR receiver 112 may discard or ignore signals that do not include codes associated with remote controls.

In command mode, tunable narrowband IR receiver 111 may receive IR signals across multiple different frequency bands and determine whether the received IR signals are transmitted from a known remote control. In an embodiment, remote controls become known during the learning mode described above. If IR signals are received from a known remote control, tunable narrowband IR receiver 111 processes the IR signal and detects the command or commands within the IR signal for execution. In an embodiment, command mode is the default mode for tunable narrowband IR receiver 111. In an embodiment, tunable narrowband IR receiver transitions from command mode to learning mode when receiving the command to initiate learning mode.

In both learning and command mode, tunable narrowband IR receiver 111 may combine a received IR signal with a local oscillator signal provided by a processor (not shown) of tunable narrowband IR receiver 111. In an embodiment, the received IR signal is a low frequency data signal. In an embodiment, combining the received IR signal with the local oscillator signal shifts the frequency of the received IR signal to a higher frequency that is centered on the frequency of the bandpass filter. In an embodiment, the local oscillator signal is a digital signal provided by the processor of tunable narrowband IR receiver 111. In this manner, the processor may shift the frequency of the received IR signal to another frequency (or frequency band) by adjusting the frequency of the local oscillator signal. This shifted frequency may be considered a frequency of interest; a frequency band may be considered a band of interest. In an embodiment, the frequency of interest is determined based on the frequency of a bandpass filter within tunable narrowband IR receiver 111; this feature is discussed further with respect to FIG. 2.

In an embodiment, first remote control 140 and/or second remote control 150 may transmit over a frequency within a number of frequencies such as 30 kHz, 33 kHz, 36 kHz, 40 kHz, and 56 kHz. In order to set the frequency of the local oscillator signal, tunable narrowband IR receiver 111 determines the frequency of the signal transmitted by first remote control 140 and/or second remote control 150. The frequency of the local oscillator signal may be based on the frequency of the signal from the remote control and a frequency of the bandpass filter.

Tunable narrowband IR receiver 111 may then filter any signals within the shifted signal that are outside of the frequency or band of interest. In an embodiment, this results in removing noise including but not limited to environmental noise and signals from other devices operating on different frequencies. As noted above, the frequency or band of interest is based on or centered on the frequency of the bandpass filter. After filtering the shifted IR signal, tunable narrowband IR receiver may then amplify the resulting filtered IR signal to increase (or decrease) the filtered IR signal so that it can be further processed. Further processing may include detecting commands and/or control codes within the filtered IR signal to determine commands to be executed and/or the identity of the remote control sending the IR signal.

In an embodiment, further processing may include extracting the low frequency data signal from the amplified filtered IR signal. In an embodiment, the extracted low frequency signal may be converted into a digital signal. In an embodiment, the amplitude of the extracted low frequency data signal may be monitored and a varying analog signal that is proportional to the monitored amplitude is generated. In an embodiment, the monitored amplitude represents the peak amplitude of the extracted low frequency data signal. The varying analog signal may then be utilized to adjust the amplification of the filtered IR signal to achieve a desired target amplitude for the amplified filtered IR signal.

In an embodiment, the processor of tunable narrowband IR receiver 111 may process the digital signal in order to determine the commands and/or control codes to be executed. In an embodiment, processor also may process the varying analog signal in order to adjust amplification settings for achieving a desired range of amplification for the amplified filtered IR signal.

Figure 2:
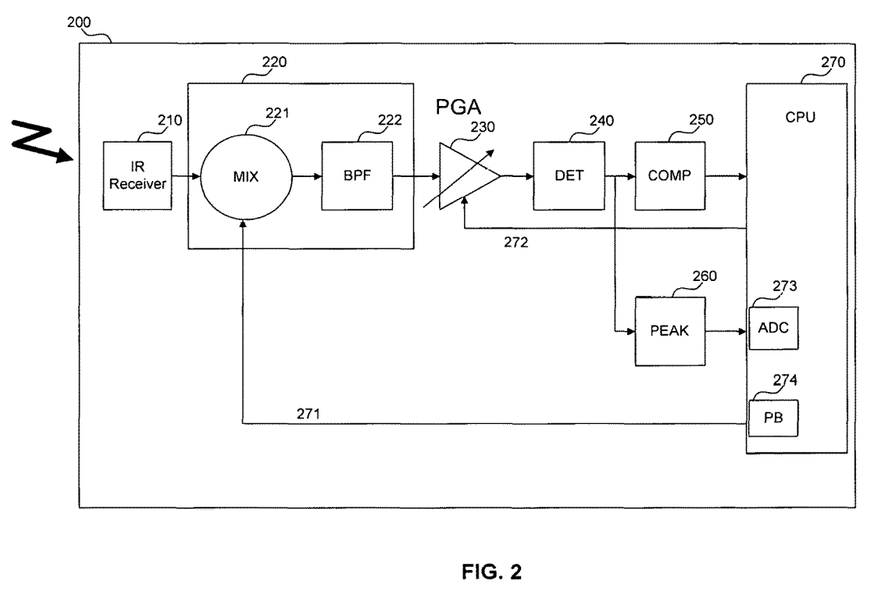
FIG. 2 illustrates a block diagram of a tunable narrowband IR receiver, according to some embodiments.

Additional details of these features are discussed with respect to FIG. 2 which illustrates a block diagram of tunable narrowband IR receiver 200, according to some embodiments. In an embodiment, tunable narrowband IR receiver 200 may include IR receiver 210, tunable component 220, programmable gain amplifier 230, detector 240, comparator 250, peak detector 260, and processor 270. In an embodiment, tunable component 220 may include frequency mixer 221 and bandpass filter 222. The following discussion of tunable narrowband IR receiver 200 will refer to devices of FIG. 1 for non-limiting, illustrative purposes. In an embodiment, tunable narrowband IR receiver 200 may be representative of tunable narrowband IR receiver 111, tunable narrowband IR receiver 121, and/or tunable narrowband IR receiver 131 in FIG. 1.

Referring to FIGS. 1 and 2, in some embodiments, first remote control 140 and/or second remote control 150 transmits commands (or other signals) for controlling or otherwise interacting with a controllable device in media system 105 that includes tunable narrowband IR receiver 200 such as display device 110, media device 120, and/or A/V device 130. The commands may be associated with controlling different settings of the device such as playback settings of content such as selecting or playing content or settings of the controllable device such as volume or picture settings.

IR receiver 210 receives an IR signal from a remote control such as first remote control 140 and/or second remote control 150. In an embodiment, the IR signal is a low frequency data signal. IR receiver 210 then passes the received IR signal to tunable component 220 which is responsible for shifting the frequency of the received IR signal to a different frequency that can be processed by subsequent components within tunable narrowband IR receiver 200. Tunable component 220 may also perform filtering of the shifted IR signal in order to remove any noise. As noted above, in an embodiment, tunable component 220 may include frequency mixer 221 and bandpass filter 222 to perform these functions.

Frequency mixer 221 receives the IR signal and combines the IR signal with a local oscillator signal 271 provided by processor 270. In an embodiment, local oscillator signal 271 is a digital signal. In an embodiment, local oscillator signal 271 is produced by peripheral block 274 of processor 270.

The frequency of local oscillator signal 271 is modifiable by processor 270 and may be modified to a specific frequency to shift the frequency of the received IR signal to a desired frequency (e.g., a frequency of interest) or within a desired frequency band (e.g., band of interest). This desired frequency is obtained based on the frequency of local oscillator signal 271 that is set by processor 270. In an embodiment, shifting the frequency of the received IR signal results in shifting the frequency to a higher or lower frequency that is centered on the frequency of local oscillator signal 271. In the embodiment where the received IR signal is a low frequency IR signal, frequency mixer 221 shifts the received IR signal to a higher frequency based on the frequency of local oscillator signal 271. Modifying the frequency of local oscillator signal 271 allows processor 270 to tune the frequencies received by tunable narrowband IR receiver 200 in order to process a greater number of frequency bands beyond conventional narrowband IR receivers.

Bandpass filter 222 receives the shifted IR signal from frequency mixer 221 and filters any signals outside of a band of interest. Examples of such signals include environmental noise or signals of other remote controllers operating on different frequencies. In an embodiment, output from the bandpass filter 222 is a filtered IR signal. In an embodiment, the specific band of interest is based on the specific characteristics of the bandpass filter 222.

Programmable gain amplifier 230 is an amplifier whose gain is programmable by processor 270 through a gain adjustment signal 272. Programmable gain amplifier 230 receives the filtered IR signal from tunable component 220 and may either increase or decrease the amplitude of filtered IR signal to ensure that it has an expected signal level that can be processed by detector 240. Examples of expected signal levels for detector 240 include levels in the range of 1.0 to 2.0 volts peak. In an embodiment, output of programmable gain amplifier 230 is an amplified signal that has a signal level appropriate for detector 240.

Detector 240 receives the amplified IR signal from programmable gain amplifier 230 and extracts or detects the original received IR signal from the amplified IR signal. In the embodiment where the received IR signal is a low frequency IR signal, detector 240 detects the low frequency IR signal from the higher frequency amplified IR signal. As noted above, amplified IR signal has a higher frequency or is otherwise within a higher band of interest based on processing by tunable component 220 in order to prepare the received IR signal for processing by subsequent components such as programmable gain amplifier 230 and detector 240. In an embodiment, output of detector 240 is the extracted IR signal.

In an embodiment, comparator 250 receives the extracted IR signal from detector 240 and converts the signal into a digital signal that can be processed by processor 270. In an embodiment, the digital signal includes the commands and/or instructions from the IR signal received by IR receiver 210. Output from the comparator is the digital signal that is the result of converting the extracted IR signal.

Peak detector 260 receives the extracted IR signal from detector 240 and monitors the amplitude levels of the extracted IR signal. Based on this monitoring, peak detector 260 may generate a varying analog signal that is proportional to a peak amplitude of the extracted IR signal. The varying analog signal varies in real time based on the extracted IR signal. In an embodiment, peak detector 260 provides the varying analog signal to analog-to-digital converter (ADC) 273 within processor 270. ADC 273 then converts the varying analog signal to a digital signal which is processed by processor 270 for determining an adjustment to the setting of programmable gain amplifier 230. This adjustment is included in the gain adjustment signal 272 which is provided by processor 270 to programmable gain amplifier 230 to achieve a desired target amplitude for amplifying the filtered IR signal that is received from tunable component 220 to produce an amplified IR signal for processing by detector 240.

Processor 270 receives information from comparator 250 and peak detector 260. In an embodiment, processor 270 receives the digital signal from comparator 250 and the varying analog signal from peak detector 260. In an embodiment, processor 270 processes the digital signal to determine which command(s) or information was included in the IR signal received by IR receiver 210. In an embodiment when tunable narrowband IR receiver 200 is in learning mode, processor 270 processes the digital signal for specific codes associated with identifying a device as a remote control. In other words, in learning mode, processor 270 is looking for codes from remote controls that are attempting to configure itself for communications with tunable narrowband IR receiver 200. In an embodiment when tunable narrowband IR receiver 200 is in command mode, processor 270 processes the digital signal for specific codes associated with commands or instructions to be performed by a device, such as display device 110, media device 120, or A/V device 130, in which tunable narrowband IR receiver 200 may be implemented.

In an embodiment, information received from peak detector 260 includes a varying analog signal. Processor 270 also may monitor a signal amplitude of the varying analog signal and transmits a gain adjustment signal to programmable gain amplifier 230 based on the monitored signal amplitude. The gain adjustment signal adjusts the setting of programmable gain amplifier 230 so that it amplifies the filtered IR signal to an amplitude within a specified range as discussed above. This function is a software automatic gain control (AGC) loop function performed by processor 270.

Figure 3:
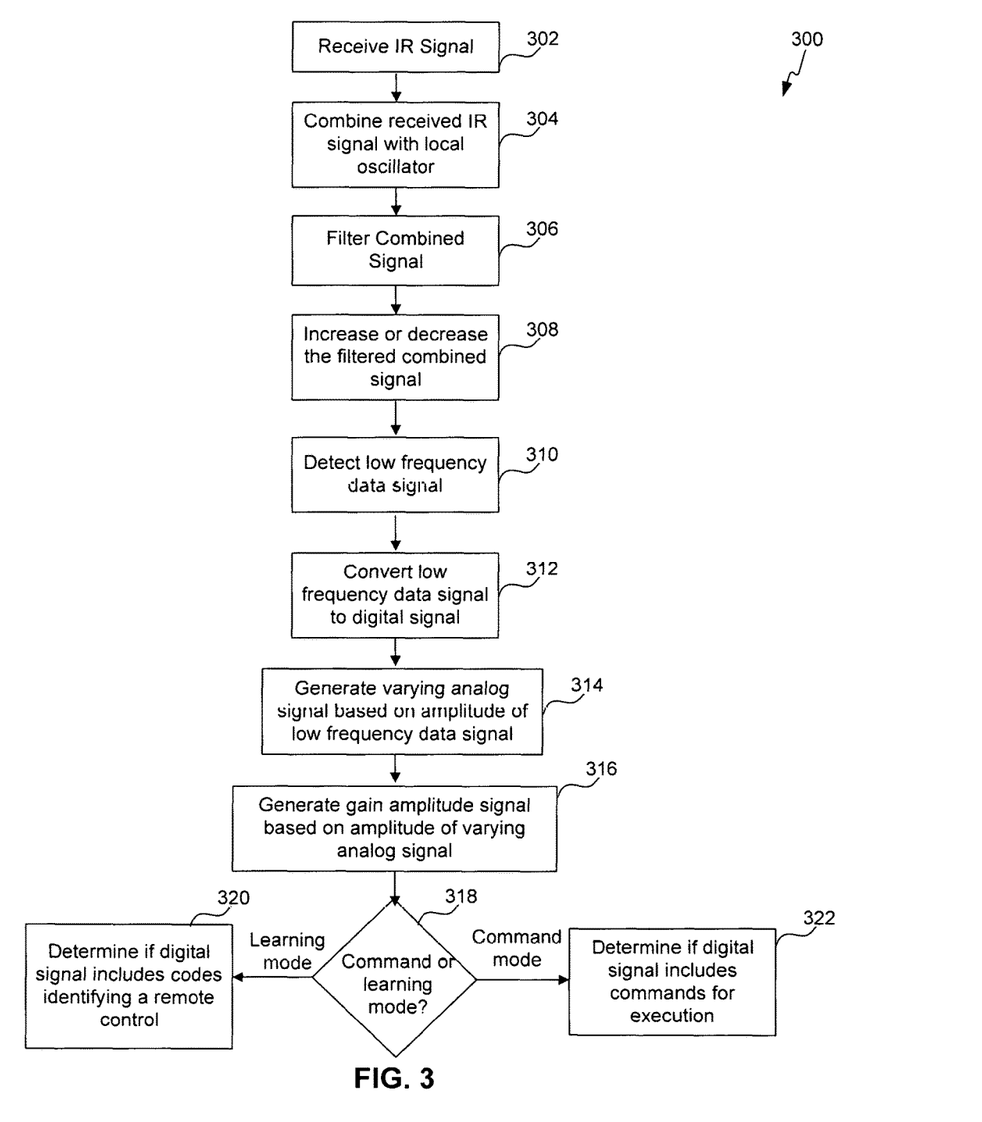
FIG. 3 is a flowchart for tuning a tunable narrowband IR receiver according to some embodiments.

FIG. 3 is a flowchart for processing an IR signal in a tunable narrowband IR receiver according to some embodiments. As a non-limiting example with regard to FIG. 2, the steps of method 300 shown in FIG. 3 may be performed by tunable narrowband IR receiver 200 to process an IR signal within any frequency band. In such an embodiment, tunable narrowband IR receiver 200 may execute code in a memory to perform method 300 of FIG. 3.

Method 300 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 3, as will be understood by a person of ordinary skill in the art. Method 300 will be described with reference to FIGS. 1 and 2. For example, method 300 may be executed by tunable narrowband IR receiver 200 within display device 110. However, method 300 is not limited to that example embodiment.

In step 302, tunable narrowband IR receiver 200 may receive an IR signal. In an embodiment, the IR signal is a low frequency data signal in a low frequency band. In an embodiment, IR signal is an analog data signal. The IR signal may be transmitted by a remote control, such as first remote control 140 or second remote control 150. In an embodiment, the IR signal includes codes identifying the device that transmitted the IR signal and/or command or commands for execution by tunable narrowband IR receiver 200 and display device 110.

In step 304, tunable narrowband IR receiver 200 may combine the received IR signal with a local oscillator signal. In an embodiment, tunable component 220 in tunable narrowband IR receiver 200 performs this combination step. The local oscillator signal may be provided by processor 270 to tunable component 220 of tunable narrowband IR receiver 200.

In step 306, tunable narrowband IR receiver 200 may filter the signal that results from combining the received IR signal and the local oscillator signal. In an embodiment, filtering the signal requires removing any signals that are outside of the band of interest. The band of interest represents the frequency band within which received IR signals need to be shifted to be further processed by tunable narrowband IR receiver 200.

In step 308, tunable narrowband IR receiver 200 may increase or decrease the amplitude of the filtered combined IR signal to arrive at a target amplitude that is established through a gain adjustment signal. In an embodiment, programmable gain amplifier 230 may perform this step. The target amplitude is programmable by processor 270 through the gain adjustment signal and represents the amplitude that can be processed by detector 240. Programmable gain amplifier 230 may shift the amplitude of the filtered combined IR signal to the target amplitude.

In step 310, tunable narrowband IR receiver 200 may extract or detect, from the amplified IR signal, the original IR signal received by tunable narrowband IR receiver 200. In an embodiment, the original IR signal is an analog data signal. In an embodiment, the original IR signal is a low frequency data signal and the amplified IR signal is a high frequency carrier signal.

In step 312, tunable narrowband IR receiver 200 may convert the extracted IR signal into a digital signal. In an embodiment, the digital signal includes a code that identifies a remote control that transmitted the original IR signal. In an embodiment, the digital signal includes a command or commands from a remote control to be executed by the display device 110 in which tunable narrowband IR receiver 200 is implemented.

In step 314, tunable narrowband IR receiver 200 may generate a varying analog signal that is proportional to the peak amplitude of the extracted IR signal. In an embodiment, tunable narrowband IR receiver monitors an amplitude of the extracted IR signal and determines the peak amplitude based on the monitored amplitude. The varying analog signal may then be used to adjust the target amplitude of the filtered combined IR signal as described in step 308.

In step 316, tunable narrowband IR receiver may generate a gain amplitude signal based on monitoring the amplitude of the varying analog signal. The gain amplitude signal may then be utilized to adjust the value of the target amplitude at which the filtered combined IR signal is shifted by programmable gain amplifier 230.

In step 318, the digital signal may be processed based on whether tunable narrowband IR receiver 200 is in command or learning mode. As noted above, in an embodiment, learning mode may be initiated by a signal that is received by tunable narrowband IR receiver. The signal may be initiated from an interface (not shown) such as button or touch inputs located or otherwise displayed on display device 110.

In step 320, tunable narrowband IR receiver 200 is in learning mode (as established in 318) and determines if the digital signal includes a code identifying a remote control. In an embodiment, certain codes are associated with remote controls and tunable narrow IR receiver 200 compares codes included with the digital signal with codes stored in an accessible memory. In an embodiment, tunable narrowband IR receiver 200 extracts the code from the digital signal and provides it to another component in display device 110 for further processing.

In step 322, tunable narrowband IR receiver 200 is in command mode (as established in 318) and determines if the digital signal includes a command or commands for execution by the device in which tunable narrowband IR receiver 200 is implemented. In an embodiment, tunable narrowband IR receiver 200 extracts and executes the command or commands from the digital signal. In an embodiment, tunable narrowband IR receiver 200 extracts the command or commands and provides it to another component in display device 110 for further execution.

Example Computer System

Figure 4:
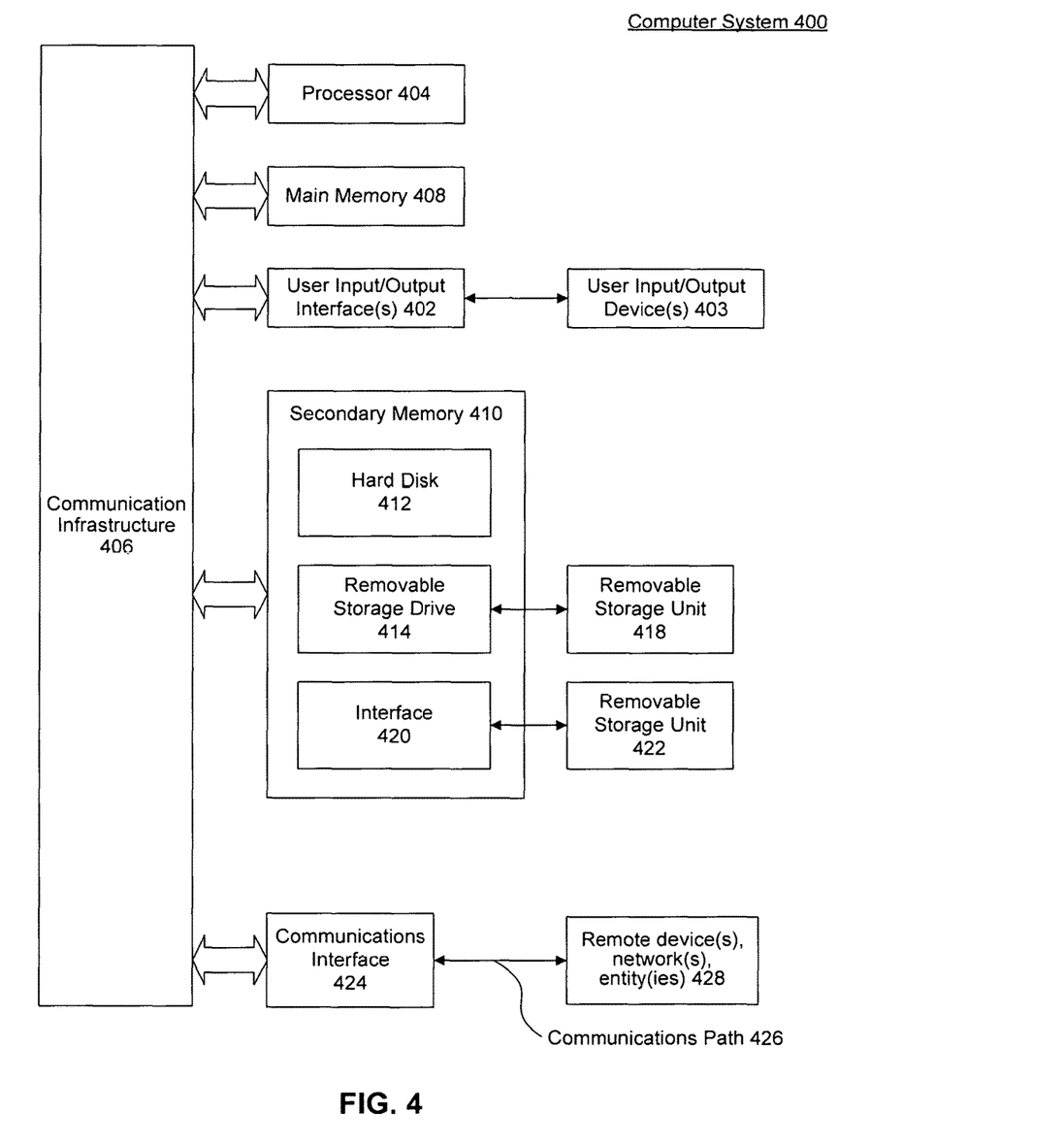
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 can be used to implement any embodiments of FIGS. 1-3, and/or any combination or sub-combination thereof.

Computer system 400 includes one or more processors (also called central processing units, or CPUs), such as a processor 404. Processor 404 is connected to a communication infrastructure or bus 406.

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A tunable narrowband infrared receiver, comprising:
an infrared diode configured to receive an infrared signal;
a frequency mixer configured to:
   receive the infrared signal from the infrared diode;
   receive a local oscillator signal wherein the local oscillator signal is associated with a frequency band; and
   combine the infrared signal and the local oscillator signal to produce a shifted signal within the frequency band;
a bandpass filter configured to filter the shifted signal by removing, from the shifted signal, signals that are outside of the frequency band to produce a filtered signal; and
a processor configured to:
   transmit the local oscillator signal to the frequency mixer; and
   detect at least one of a remote control code or a command within the infrared signal based on the filtered signal.

2. The tunable narrowband infrared receiver of claim 1, wherein the infrared signal is received from a first remote control and wherein the infrared diode is further configured to:
receive another infrared signal from a second remote control, wherein the infrared signal comprises a first frequency and the other infrared signal comprises a second frequency.

3. The tunable narrowband infrared receiver of claim 1, wherein the infrared signal is a low frequency data signal, the receiver further comprising:

a programmable gain amplifier configured to:
receive the filtered signal from the bandpass filter; and
modify the filtered signal based on an expected amplitude to produce an amplified signal; and
a detector configured to:
extract the low frequency data signal from the amplified signal; and
transmit an analog output signal based on the extracted low frequency data signal.

4. The tunable narrowband infrared receiver of claim 3, further comprising:
a comparator configured to:
receive the analog output signal from the detector; and
convert the analog output signal into a digital signal.

5. The tunable narrowband infrared receiver of claim 4, wherein to detect at least one of the remote control code or the command within the infrared signal based on the filtered signal, the processor is configured to:
receive the digital signal from the comparator; and
process the digital signal to determine at least one of the remote control code and the command.

6. The tunable narrowband infrared receiver of claim 4, further comprising:
a peak detector configured to:
receive the analog output signal from the detector;
detect a peak amplitude of the analog output signal;
generate a varying analog signal based on the peak amplitude; and
transmit the varying analog signal to the processor.

7. The tunable narrowband infrared receiver of claim 6, wherein the processor is further configured to:
receive the varying analog signal from the peak detector;
monitor an amplitude of the varying analog signal; and
adjust a gain setting of the programmable gain amplifier to modify the expected amplitude.

8. The tunable narrowband infrared receiver of claim 1, wherein the infrared signal comprises a first frequency and the shifted signal comprises a second frequency, and the first frequency is different from the second frequency.

9. A method for tuning a narrowband infrared receiver, comprising:
receiving a command to initiate tuning of the narrowband infrared receiver;
initiating, based on the command, a scan across an entire frequency band;
detecting, based on the scan, an infrared signal from a remote control, wherein the infrared signal comprises a remote control code associated with the remote control;
combining the infrared signal and a local oscillator signal to produce a shifted signal within the frequency band;
filtering the shifted signal by removing, from the shifted signal, signals that are outside of the frequency band to produce a filtered signal; and
processing the filtered signal to detect the remote control code associated with the remote control.

10. The method of claim 9, wherein the infrared signal is a low frequency data signal, the method further comprising:
modifying the filtered signal based on an expected signal level of a detector to produce an amplified signal;
extracting the low frequency data signal from the amplified signal; and
generating an analog output signal at a target amplitude based on the extracted low frequency data signal.

11. The method of claim 10, further comprising converting the analog output signal into a digital signal.

12. The method of claim 11, wherein detecting the command within the infrared signal based on the filtered signal comprises processing the digital signal to determine at least one of the remote control code and the command.

13. The method of claim 10, further comprising:
detecting a peak amplitude of the analog output signal; and
generating a varying analog signal based on the peak amplitude.

14. The method of claim 13, further comprising:
monitoring an amplitude of the varying analog signal; and
adjusting a gain setting to modify the expected signal level.

15. The method of claim 12, wherein the infrared signal comprises a first frequency and the shifted signal comprises a second frequency, and the first frequency is different from the second frequency.

16. A non-transitory, tangible computer-readable device having instructions stored thereon that, when executed by a tunable narrowband infrared receiver, cause the tunable narrowband infrared receiver to perform operations comprising:
receiving a command to initiate tuning of the narrowband infrared receiver;
initiating, based on the command, a scan across an entire frequency band;
detecting, based on the scan, an infrared signal from a remote control, wherein the infrared signal comprises a remote control code associated with the remote control;
combining the infrared signal and a local oscillator signal to produce a shifted signal within the frequency band;
filtering the shifted signal by removing, from the shifted signal, signals that are outside of the frequency band to produce a filtered signal; and
processing the filtered signal to detect the remote control code associated with the remote control.

17. The non-transitory, tangible computer-readable device of claim 16, wherein the infrared signal is received from a first remote control and wherein the operations further comprise:
receiving another infrared signal from a second remote control, wherein the infrared signal comprises a first frequency and the another infrared signal comprises a second frequency.

18. The non-transitory, tangible computer-readable device of claim 16, wherein the infrared signal is a low frequency data signal, the operations further comprising:
modifying the filtered signal based on an expected signal level to produce an amplified signal;
extracting the low frequency data signal from the amplified signal; and
generating an analog output signal at a target amplitude based on the extracted low frequency data signal.

19. The non-transitory, tangible computer-readable device of claim 18, the operations further comprising:
converting the analog output signal into a digital signal.

20. The non-transitory, tangible computer-readable device of claim 18, the operations further comprising:
detecting a peak amplitude of the analog output signal; and
generating a varying analog signal based on the peak amplitude.

* * * * *